(12) United States Patent
Matsuoka et al.

(10) Patent No.: US 10,754,108 B2
(45) Date of Patent: Aug. 25, 2020

(54) OPTICAL SUBASSEMBLY, METHOD FOR MANUFACTURING OPTICAL SUBASSEMBLY, AND OPTICAL MODULE

(71) Applicant: Lumentum Japan, Inc., Kanagawa (JP)

(72) Inventors: Yasunobu Matsuoka, Tokyo (JP); Shigehisa Tanaka, Tokyo (JP)

(73) Assignee: Lumentum Japan, Inc., Kanagawa (JP)

( * ) Notice: Subject to any disclaimer, the term of this patent is extended or adjusted under 35 U.S.C. 154(b) by 0 days.

(21) Appl. No.: 16/296,477

(22) Filed: Mar. 8, 2019

(65) Prior Publication Data

US 2019/0317284 A1 Oct. 17, 2019

(30) Foreign Application Priority Data

Apr. 16, 2018 (JP) ................. 2018-078336

(51) Int. Cl.
*G02B 6/42* (2006.01)
(52) U.S. Cl.
CPC .......... *G02B 6/4239* (2013.01); *G02B 6/424* (2013.01); *G02B 6/4214* (2013.01); *G02B 6/4244* (2013.01); *G02B 6/4246* (2013.01)
(58) Field of Classification Search
CPC .................................................. G02B 6/4239
See application file for complete search history.

(56) References Cited

U.S. PATENT DOCUMENTS

| | | | | |
|---|---|---|---|---|
| 8,985,865 B2* | 3/2015 | Howard | ............... | G02B 6/3829 385/79 |
| 2001/0004413 A1* | 6/2001 | Aihara | ................. | G02B 6/4214 385/88 |
| 2008/0166136 A1 | 7/2008 | Birincioglu et al. | | |
| 2010/0104290 A1* | 4/2010 | Nobuhara | ............. | G02B 6/4246 398/82 |
| 2012/0213475 A1* | 8/2012 | Selli | ..................... | G02B 6/4214 385/33 |
| 2015/0098675 A1* | 4/2015 | Ishiyama | ............... | G02B 6/428 385/14 |
| 2015/0338590 A1* | 11/2015 | Morioka | .............. | G02B 6/4249 385/33 |
| 2017/0212320 A1 | 7/2017 | Hara | | |

FOREIGN PATENT DOCUMENTS

JP 5714229 B2 5/2015
JP 2017-135194 A 8/2017

* cited by examiner

*Primary Examiner* — Omar R Rojas
(74) *Attorney, Agent, or Firm* — Harrity & Harrity, LLP

(57) ABSTRACT

An optical subassembly may have an optical waveguide for transmitting an optical signal, a lens element with a lens and a mirror integrated, a supporting element to which the optical waveguide and the lens element are attached, an optical element for converting the optical signal and an electric signal from one to another at least, and a substrate to which the optical element and the supporting element are attached.

20 Claims, 10 Drawing Sheets

OPTICAL SUBASSEMBLY, METHOD FOR MANUFACTURING OPTICAL SUBASSEMBLY, AND OPTICAL MODULE

CROSS-REFERENCE TO RELATED APPLICATION

The present application claims priority from Japanese application JP 2018-078336 filed on Apr. 16, 2018, the content of which is hereby incorporated by reference into this application.

BACKGROUND OF THE INVENTION

1. Field of the Invention

This relates to optical subassemblies, their manufacturing method, and optical modules.

2. Description of the Related Art

Downsizing and cost reduction of optical modules are required. JP 5714229B discloses an optical subassembly integrally with components such as a mirror for reflecting input/output light and a lens for condensing it. JP 2017-135194A discloses an optical module with a metal case housing an optical semiconductor device.

JP 5714229B discloses how to mount components by passive alignment using a mark. The passive alignment can cut down manufacturing cost although JP 5714229B shows that an optical fiber and the lens have their position fixed and unchangeable, impeding absorption of component tolerances.

JP 2017-135194A discloses active alignment during optical axis adjustment with optical properties being monitored in a process of mounting the components. The active alignment may attain stable, high optical coupling characteristics but may increase manufacturing costs due to more steps and more difficulties.

SUMMARY OF THE INVENTION

This is to aim at realizing easy adjustment of positioning components.

(1) An optical subassembly may include an optical waveguide for transmitting an optical signal; a lens element with a lens and a mirror integrated; a supporting element to which the optical waveguide and the lens element are attached; an optical element for converting the optical signal and an electric signal from one to another at least; and a substrate to which the optical element and the supporting element are attached.

This enables the lens element to be aligned with the optical element after being attached to the supporting element, realizing easy adjustment of positioning the optical element and the lens element, by combination of passive alignment and active alignment.

(2) In the optical subassembly according to (1), the lens element and the supporting element may be made of materials with different optical properties.

(3) In the optical subassembly according to (2), the lens element may be made of a resin with a transmittance of 70% or more corresponding to an optical wavelength of the optical signal, and the supporting element may be made of a resin with a transmittance of 60% or more corresponding to ultraviolet light.

(4) In the optical subassembly according to any one of (1) to (3), the substrate may include a wiring layer and a resist layer covering the wiring layer, and the resist layer may be configured to avoid at least a part of an opposed area to the supporting element.

(5) In the optical subassembly according to any one of (1) to (4), the supporting element may have a recess on a side opposed to the substrate, and the optical element may be inside the recess.

(6) The optical subassembly according to (5) may further include an adhesion layer between the supporting element and the substrate, and around the recess.

(7) In the optical subassembly according to (6), the recess may be made to be a confined space with the substrate, the supporting element, the adhesion layer, and the lens element.

(8) The optical subassembly according to any one of (5) to (7), may further include an integrated circuit chip inside the recess.

(9) In the optical subassembly according to any one of (1) to (8), the supporting element may have a lower surface opposed to the substrate and an upper surface on which the lens element is mounted, and the upper surface may slope with respect to the lower surface to mount the lens element on a slant.

(10) In the optical subassembly according to any one of (1) to (9), the supporting element and at least one of the optical waveguide and the lens element may have mutual alignment marks, and the supporting element and the substrate may have no mutual alignment marks.

(11) An optical module may include the optical subassembly according to any one of (1) to (10), as each of a transmitter optical subassembly and a receiver optical subassembly; and a main substrate. The transmitter optical subassembly and the receiver optical subassembly may be on the main substrate.

(12) A method for manufacturing an optical subassembly may include attaching an optical waveguide, for transmitting an optical signal, on a supporting element; attaching a lens element, with a lens and a mirror integrated, on the supporting element; attaching an optical element, for converting the optical signal and an electric signal from one to another at least, on a substrate; and attaching the supporting element, to which the optical waveguide and the lens element are attached, to the substrate to which the optical element is attached. The supporting element and at least one of the optical waveguide and the lens element may be aligned by passive alignment. The supporting element and the substrate may be aligned by active alignment.

This realizes easy adjustment of positioning the optical element and the lens element, by combination of passive alignment and active alignment.

(13) In the method for manufacturing the optical subassembly according to (12), the process of attaching the supporting element to the substrate may include providing a UV curable adhesive between the supporting element and the substrate and irradiating the UV curable adhesive with ultraviolet rays.

(14) In the method for manufacturing the optical subassembly according to (13), the supporting element may be made of a resin with a transmittance of 60% or more corresponding to ultraviolet light, and the ultraviolet rays may be applied through the supporting element.

DETAILED DESCRIPTION OF THE INVENTION

Figure 1:
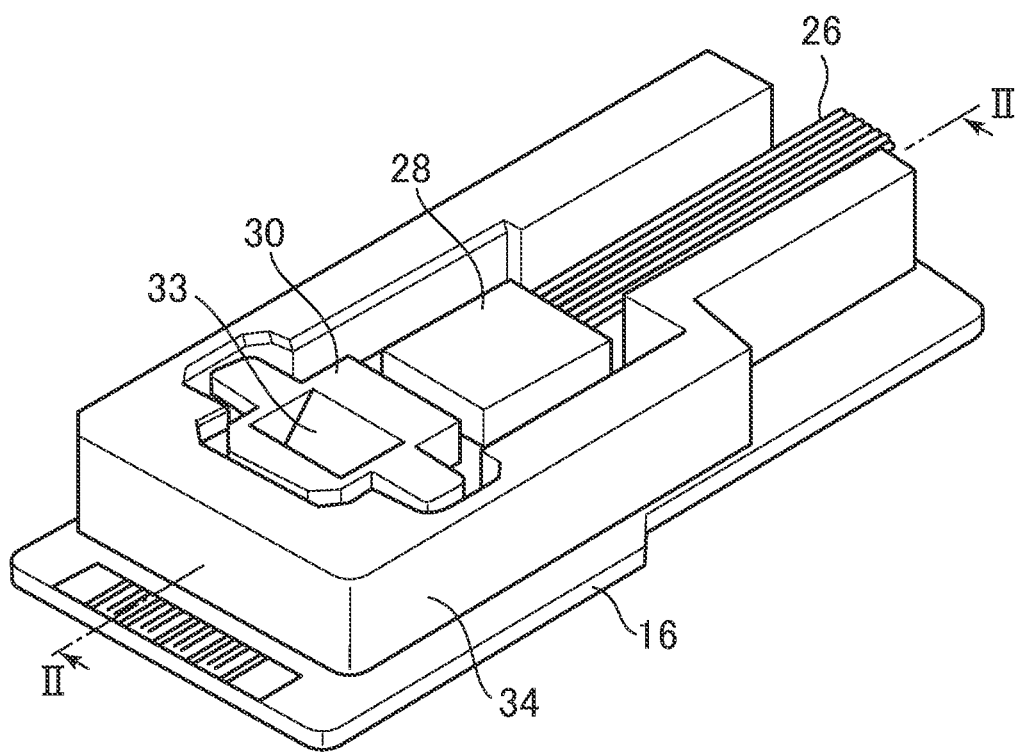
FIG. 1 is a schematic perspective view of an optical subassembly in an embodiment.

Hereinafter, some embodiments will be described specifically and in detail with reference to drawings. In all the drawings, the members with the same reference numerals have the identical or same function and their repetitive description will be omitted. Sizes of figures do not always comply with magnification.

Figure 2:
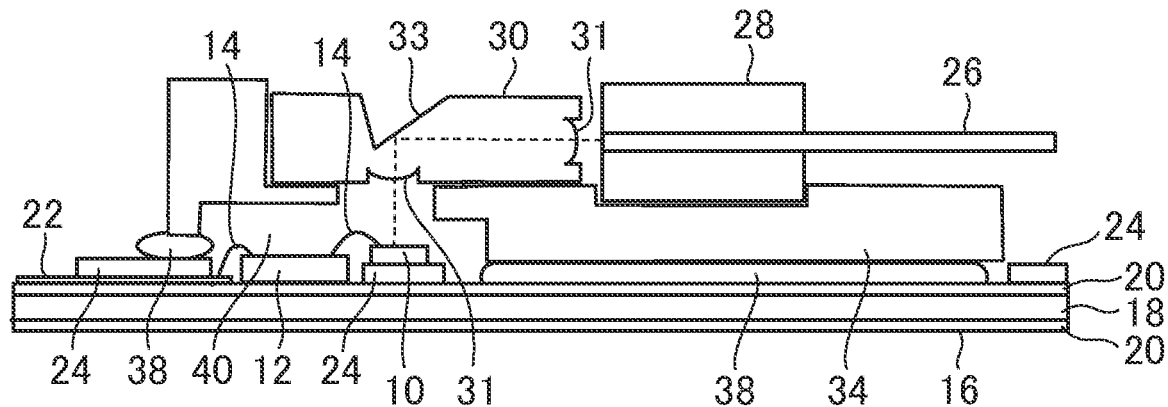
FIG. 2 is a II-II line cross sectional view of the optical subassembly in FIG. 1.

FIG. 1 is a schematic perspective view of an optical subassembly in an embodiment. FIG. 2 is a II-II line cross sectional view of the optical subassembly in FIG. 1.

The optical subassembly has an optical element 10. The optical element 10 is configured to convert an optical signal and an electric signal from one to another at least. The optical subassembly is, for example, a transmitter optical subassembly (TOSA) with a light-emitting element or a receiver optical subassembly (ROSA) with a light-receiving element or may be equipped with both the light-emitting element and the light-receiving element.

An integrated circuit chip 12 is next to the optical element 10 for drive, control, and amplification thereof. The integrated circuit chip 12 and the optical element 10 are electrically connected to each other through wires 14. The multichannel optical element 10 (e.g. 4 channels) may have the wires 14 for respective channels. The transmitter optical subassembly has the integrated circuit chip 12 with a laser driver circuit for outputting the electric signal and outputting a bias current to drive the optical element 10. The receiver optical subassembly has a transimpedance amplifier circuit for amplifying the electric signal from the optical element 10.

The optical element 10 and the integrated circuit chip 12 are mounted on (attached to) a substrate 16. The optical element 10 and the integrated circuit chip 12 may be mounted with respective electrode surfaces facing upward (face-up), or at least one of them may be flip-chip mounted with its electrode surface facing downward (face-down).

Figure 3:
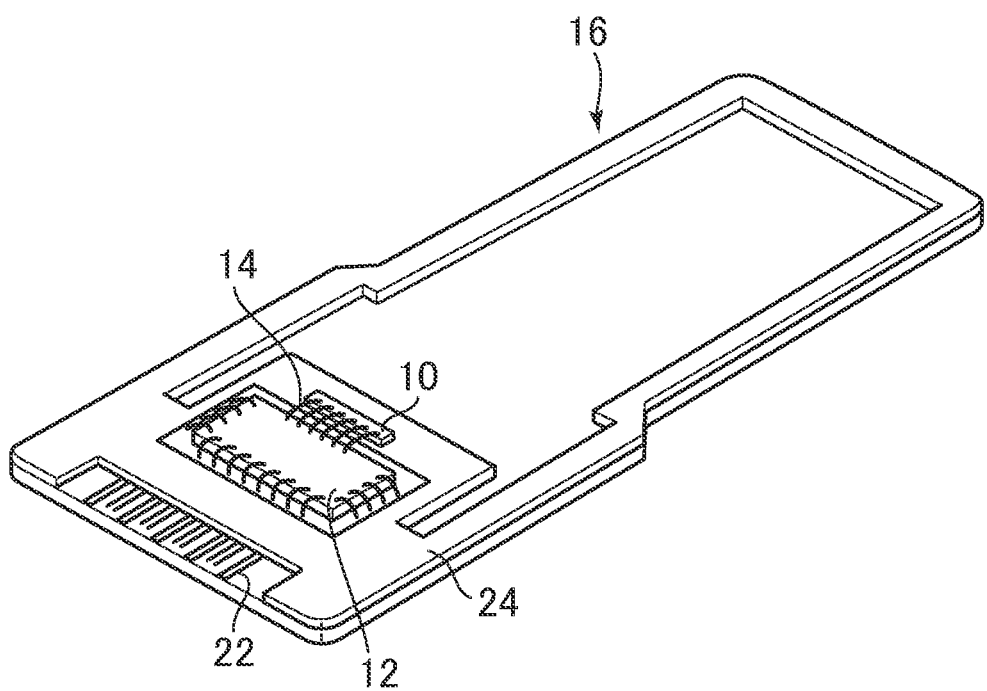
FIG. 3 is a perspective view of a substrate in FIG. 1.

FIG. 3 is a perspective view of the substrate 16 in FIG. 1. As shown in FIG. 2, the substrate 16 is a multi-layer build-up board, including a core layer 18 made of an organic material such as a glass-cloth epoxy resin and prepreg layers 20 laminated over and under it. The substrate 16 includes a wiring layer 22 for constituting an interconnect pattern and a resist layer 24 to cover and protect the wiring layer 22. The resist layer 24 is configured to avoid at least a part of an opposed area to a supporting element 34 described below.

The optical subassembly has an optical waveguide 26 for transmitting the optical signal. The optical waveguide 26 (e.g. optical fiber) at its edge has a receptacle 28 attached thereto. Some optical waveguides 26 are coupled with one receptacle 28. The optical waveguide 26 is optically connected to the optical element 10 through a lens element 30.

The lens element 30 has a lens 31 and a mirror 33 integrated. The lens element 30 is between the optical element 10 and the optical waveguide 26. The lens 31 collimates or condenses light of the optical signal, while the mirror 33 converts an optical path of the optical signal. The lens 31 is just above a light-emitting portion or a light-receiving portion of the optical element 10. The optical path between the lens element 30 and the mirror 33, for example, is perpendicular to a surface of the substrate 16, while the optical path between the lens element 30 and the optical waveguide 26 is parallel to the surface of the substrate 16. The lens element 30 should be made of a resin [e.g. polyetherimide resin (PEI)] with a transmittance of 70% or more corresponding to an optical wavelength of the optical signal (wavelength: 0.85-1.55 μm).

Figure 4:
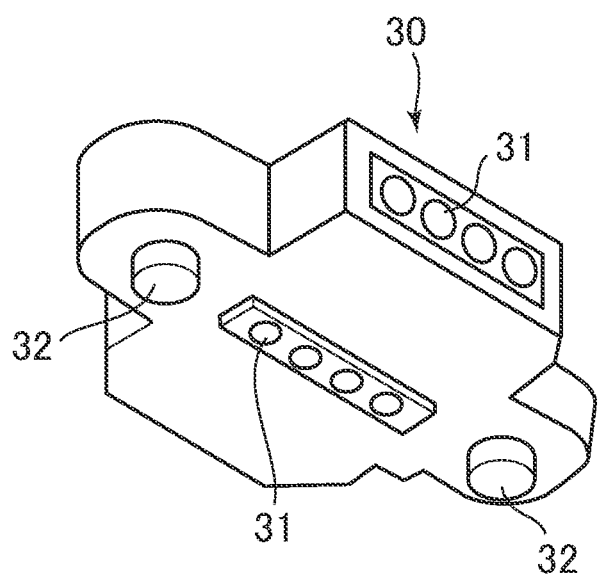
FIG. 4 is a perspective view of a lens element.

FIG. 4 is a perspective view of a lens element 30. The lens element 30 on each of its side and bottom surfaces has some lenses 31 arranged in parallel for respective multiple channels. The lens element 30 should be integrally formed by molding method using a mold, for enhancing relative position accuracy of the lens 31 and the mirror 33. The lens element 30 may have a double lens configuration where the lens 31 is provided on each of incoming and outgoing sides of light or may be configured to have the lens 31 only on one of its side and bottom surfaces. The lens element 30 on its bottom surface has guide pins 32 next to both sides of the lenses 31 along an arrangement direction of the lenses 31. The guide pins 32 are to be used for position adjustment with the supporting element 34.

The optical subassembly has the supporting element 34 to which the optical waveguide 26 and the lens element 30 are attached. The supporting element 34 has a guide hole 36 (FIG. 6) for inserting the guide pin 32 of the lens element 30. The supporting element 34 should be made of a resin (e.g. polycarbonate resin) with a transmittance of 60% or more corresponding to ultraviolet light (wavelength: about 200-400 nm). The supporting element 34 is made of a material with an optical property different from that of the lens element 30, having a choice of materials in response to requirements. The supporting element 34 is attached to the substrate 16. The supporting element 34 and the substrate 16 have no mutual alignment marks. They are made attached with an adhesion layer 38. The adhesion layer 38 is configured to avoid contact with at least a part of the resist layer 24 on the substrate 16, thereby improving adhesion strength.

Figure 5:
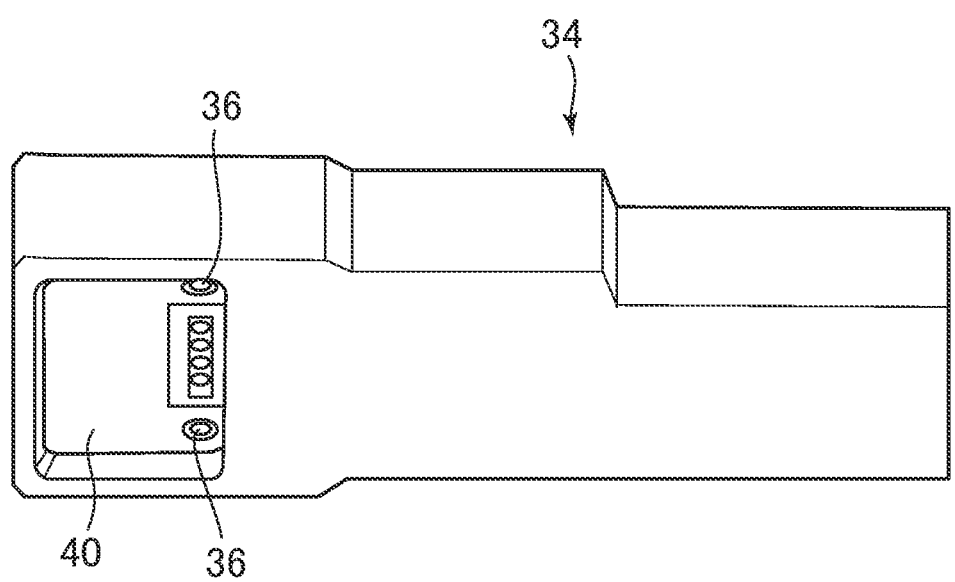
FIG. 5 is a perspective view of a supporting element as seen obliquely from below.

FIG. 5 is a perspective view of the supporting element 34 as seen obliquely from below. The supporting element 34 has a recess 40 on a side opposed to the substrate 16. The optical element 10 is inside the recess 40 in the supporting element 34 (FIG. 2). The integrated circuit chip 12 is also inside the recess 40. The adhesion layer 38 is interposed between the supporting element 34 and the substrate 16, around the recess 40. The resist layer 24 is removed from at least a part of an area where the lens element 30 is mounted on the surface of the substrate 16, increasing adhesion strength between the lens element 30 and the substrate 16, avoiding failures such as separation of the resist layer 24 due to expansion and contraction of the adhesion layer 38 caused by fluctuation in environmental temperature.

The recess 40 is made a confined space with the substrate 16, the supporting element 34, the adhesion layer 38, and lens element 30. The optical element 10 is simply sealed in the confined space, preventing hindrance to the optical path and deterioration of optical coupling efficiency, due to intrusion of foreign objects such as extraneous waste or dust and waterdrops.

The embodiment enables the lens element 30 to be positioned relative to the optical element 10 after being attached to the supporting element 34, whereby the optical element 10 and the lens element 30 can be easily positioned, by combination of passive alignment and active alignment. This can achieve downsizing and manufacturing of optical subassemblies at low costs.

Figure 6:
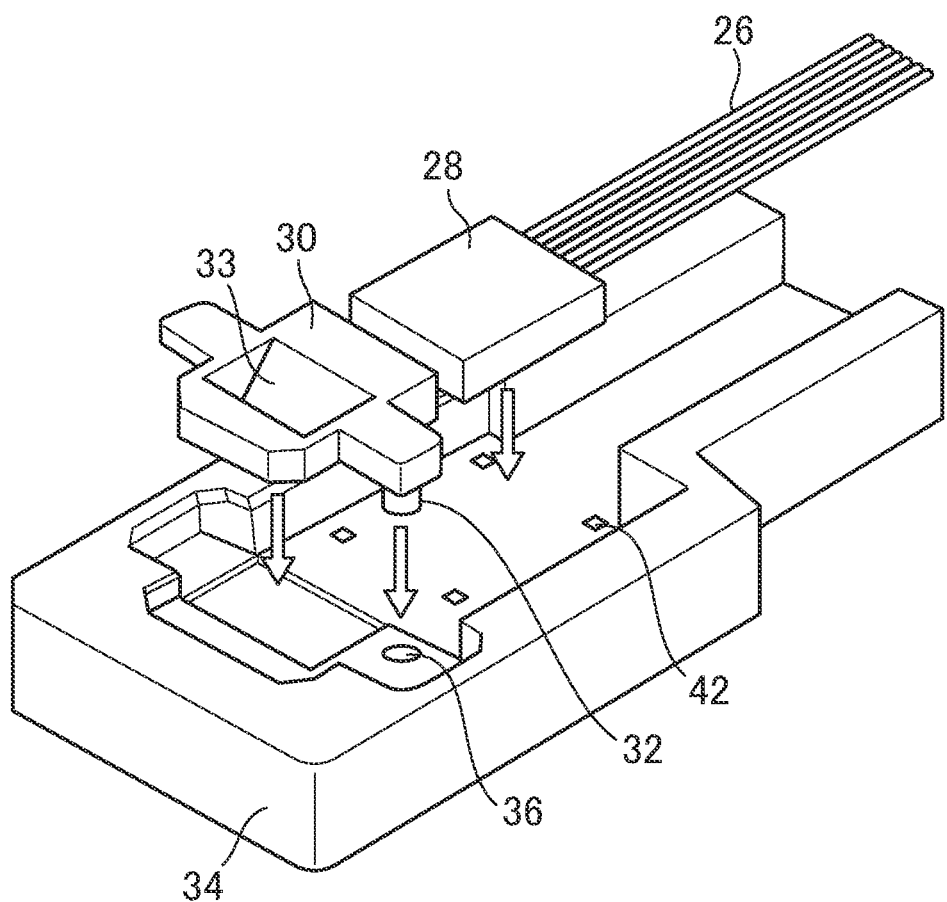
FIG. 6 is a diagram of explaining a method for manufacturing the optical subassembly in the embodiment.
Figure 7:
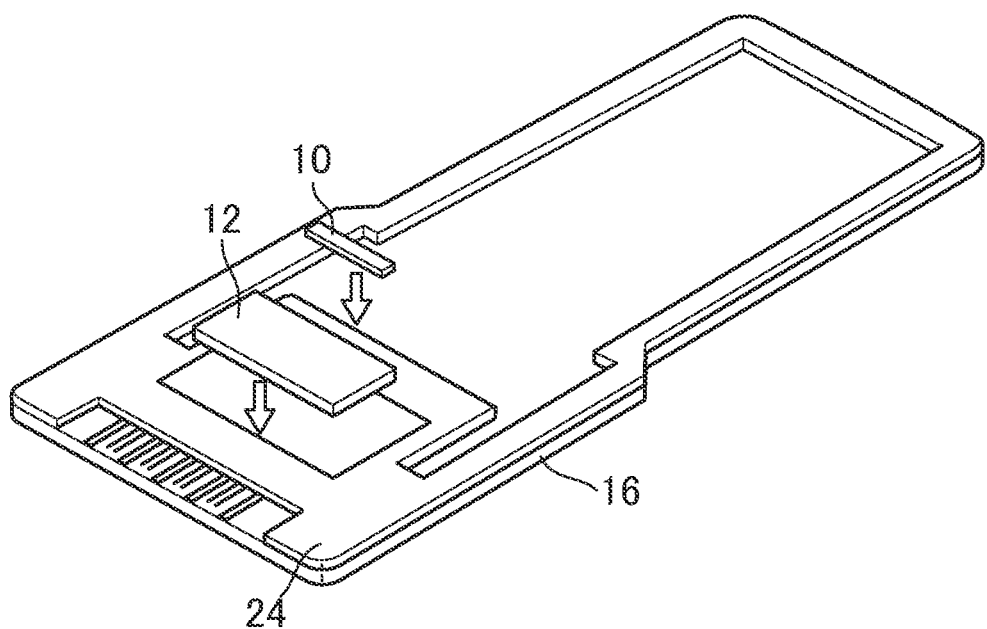
FIG. 7 is a diagram of explaining the method for manufacturing the optical subassembly in the embodiment.
Figure 8:
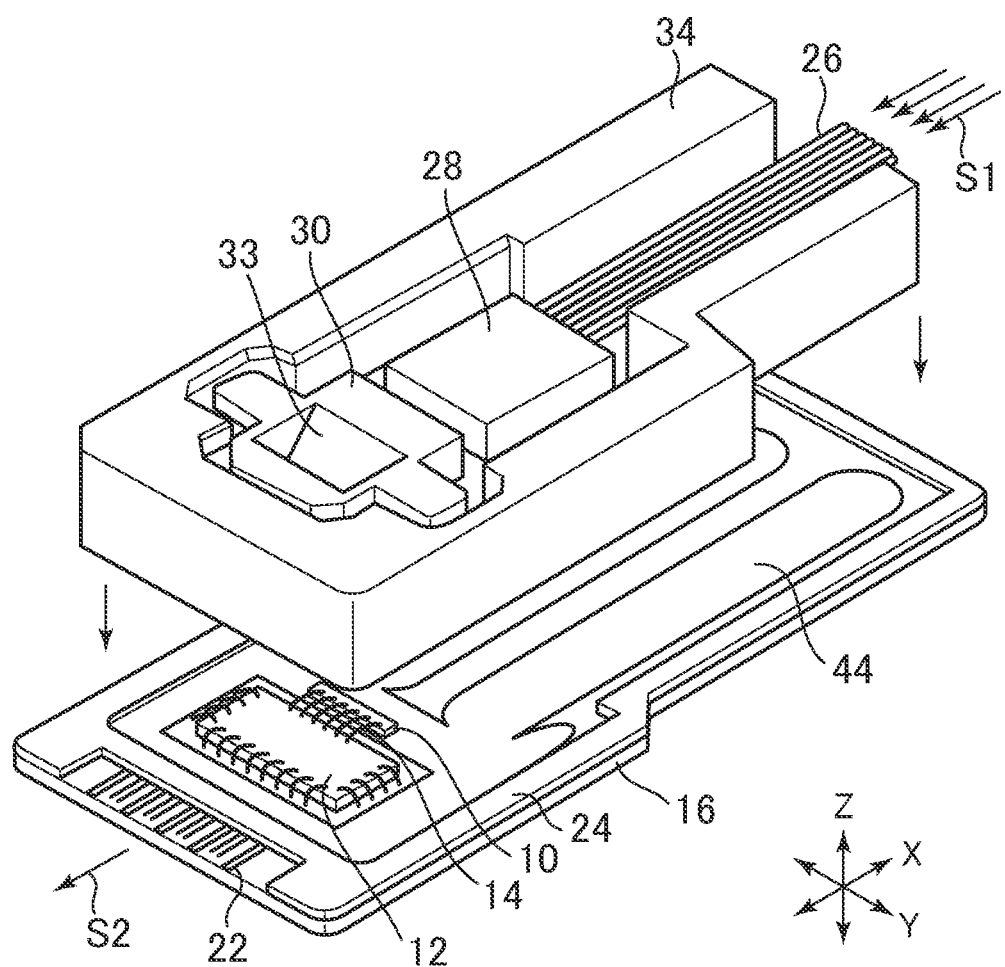
FIG. 8 is a diagram of explaining the method for manufacturing the optical subassembly in the embodiment.

FIGS. 6 to 8 are diagrams of explaining a method for manufacturing the optical subassembly in the embodiment. FIG. 6, for example, shows how to attach the optical waveguide 26 to the supporting element 34. Specifically, the receptacle 28 equipped with the optical waveguide 26 (optical fiber) is attached to the supporting element 34. The receptacle 28 is attached at a predetermined position while an alignment mark 42 on the supporting element 34 is observed. Further, the lens element 30 is attached to the supporting element 34. The lens element 30 is positioned by inserting the guide pin 32 in the guide hole 36 of the supporting element 34 for their fit. The supporting element 34 and at least one of the optical waveguide 26 and the lens element 30 have mutual alignment marks. The supporting element 34 and at least one of the optical waveguide 26 and lens element 30 are positioned by passive alignment.

FIG. 7 shows how to attach the optical element 10 to the substrate 16. The optical element 10 and the integrated circuit chip 12 may be close to each other and mounted on the substrate 16, by face-up or flip chip. Further, the optical element 10 and the integrated circuit chip 12 are die-bonded, and then respective electrode pads (not shown) thereof are electrically connected with a wire 14 or a solder ball (FIG. 8).

FIG. 8 shows how to attach the supporting element 34, with the optical waveguide 26 and the lens element 30 attached thereon, to the substrate 16 to which the optical element 10 is attached. The supporting element 34 and the substrate 16 are positioned by active alignment. For example, A UV curable adhesive 44 is applied to the substrate 16 in an area where the supporting element 34 is to be mounted. After its application, positioning of the supporting element 34 is still possible, since the UV curable adhesive 44 remains uncured until ultraviolet ray irradiation.

Manufacturing processes of receiver optical subassemblies may include inputting the optical signal S1 in the optical waveguide 26, inputting light in the light-receiving portion of the optical element 10 (light-receiving element) through the receptacle 28 and the lens element 30, monitoring the electric signal S2 output from the integrated circuit chip 12 after photoelectric conversion, meanwhile positioning an optical axis in respective directions of XYZ to achieve the largest output value on every channel.

The embodiment realizes easy adjustment of positioning the optical element 10 and the lens element 30, by combination of passive alignment and active alignment. The positioning is carried out by interposing the UV curable adhesive 44 between the supporting element 34 and the substrate 16.

After that, the UV curable adhesive 44 is irradiated with the ultraviolet rays. The supporting element 34 is made of the resin with the transmittance of 60% or more corresponding to the ultraviolet light, whereby irradiation by the ultraviolet rays is possible through the supporting element 34.

In general, materials with high transmittance of ultraviolet rays tend to have not high transmittance with respect to a wavelength zone (0.85-1.55 µm) of signals for optical communication, losing much propagation light. Thus, the lens element 30 is made of the material with the high transmittance with respect to light signal wavelength, while the supporting element 34 is made of the material with the high transmittance of ultraviolet rays. In short, the materials are differently used for the lens element 30 and the supporting element 34, achieving an effect of stable high optical coupling characteristics, together with another effect of manufacturing workload reduction and manufacturing cost reduction.

Figure 9:
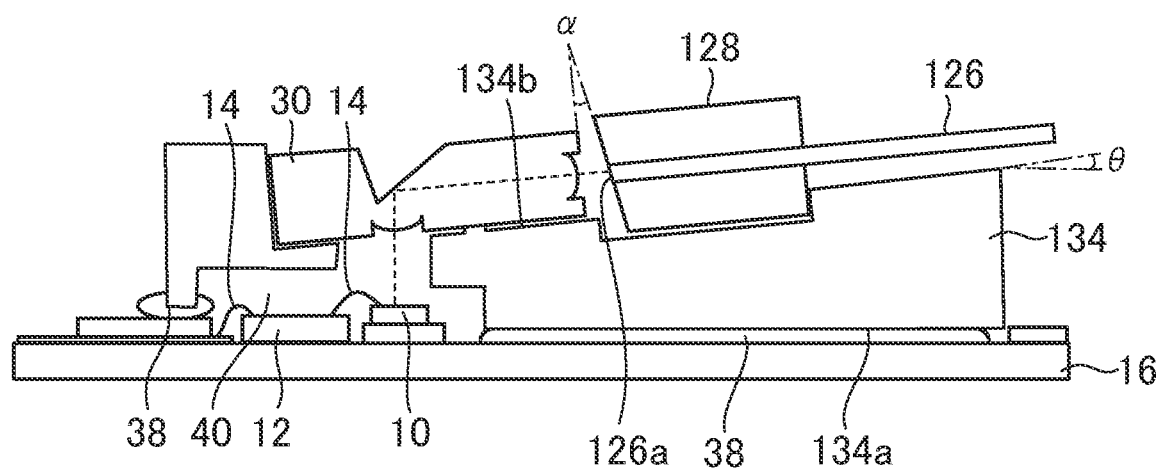
FIG. 9 is a cross sectional view of an optical subassembly in a variation of the embodiment.

FIG. 9 is a cross sectional view of an optical subassembly in a variation of the embodiment. This example shows that the supporting element 134 has a lower surface 134a opposed to the substrate 16 and an upper surface 134b on which the lens element 30 is mounted. The upper surface 134b slopes (inclination angle θ) relative to the lower surface 134a, enabling the lens element 30 to be slantingly mounted thereon. The upper surface 134b also has the receptacle 128 slantingly mounted thereon.

In general, light traveling in a space is reflected because of refractive index difference between air and component materials, whereby reflected light returns to an optical element or an optical fiber, destabilizing operation of the optical element and making noises. The problem is so serious specifically in a single-mode optical system that an anti-reflection (AR) film is formed on a light-incoming/-outgoing surface of the component, as a countermeasure. However, the AR film cannot completely prevent the light from returning.

In the variation, the lens element 30 reflects the light but slants to prevent the reflected light from recombining with the optical element 10. The inclination angle θ should be approximately not less than 3° and not more than 10° for preferably higher efficiency of optical coupling with signal light, and in consideration of suppressing effect of impact from reflection light. Still, the optical waveguide 126 has an edge surface 126a, which should slope (inclination angle α) with respect to a surface perpendicular to an optical axis of the lens element 30 for prevention of light reflection.

Figure 10:
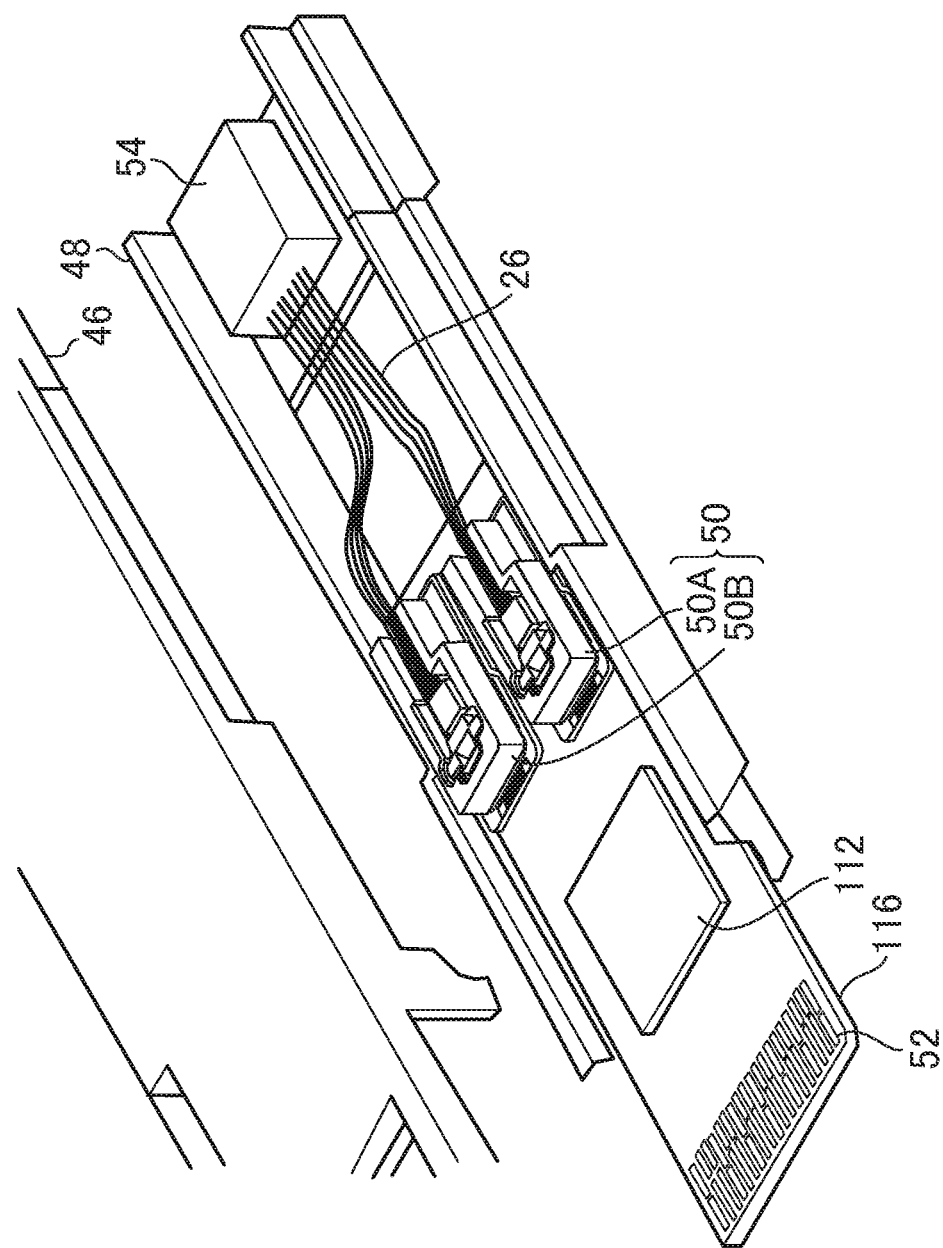
FIG. 10 is an exploded perspective view of the optical module in the embodiment.

FIG. 10 is an exploded perspective view of the optical module in the embodiment. The optical module has some optical subassemblies 50 housed in an upper case 46 and a lower case 48 for packaging. The particulars thereof are the same as those of the above optical subassembly. The optical module is a transceiver (optical transceiver) equipped with a transmitter optical subassembly (TOSA) 50A and a receiver optical subassembly (ROSA) 50B.

The optical module is configured to exchange telecommunications signals (high frequency signals) with an external host device. The electric signals input from the host device are to be input to the optical subassembly (TOSA) 50A after signal conversion processing, converted into optical signals, and output. In contrast, the optical signal input to the optical subassembly (ROSA) 50B are to be converted into electric signals, and output to the external host device after processing such as amplification.

The transmitter optical subassembly 50A and the receiver optical subassembly 50B share the main substrate 116. The main substrate 116 has the integrated circuit chip 112 mounted thereon for signal processing. The main substrate 116 at one edge thereof has terminals 52 mounted thereon, as an electrical interface for inputting/outputting driving bias currents or electric signals. The main substrate 116 at another edge thereof has an optical connector 54 mounted thereon, as an optical interface for inputting/outputting optical signals. The optical waveguides 26 (optical fibers)

are collectively connected to the optical connector 54. With the above optical subassembly, the embodiment realizes downsizing and low pricing of optical transceivers. Each component of the transmitter optical subassembly 50A and the receiver optical subassembly 50B may be directly mounted on the main substrate 116 without using the substrate 16.

While there have been described what are at present considered to be certain embodiments, it will be understood that various modifications may be made thereto, and it is intended that the appended claims cover all such modifications as fall within the true spirit and scope of the invention.

What is claimed is:

1. An optical subassembly comprising:
    an optical waveguide for transmitting an optical signal;
    a lens element comprising a lens and a mirror;
    a supporting element to which the optical waveguide and the lens element are attached,
        wherein the supporting element is made of a resin with a transmittance of 60% or more corresponding to ultraviolet light;
    an optical element configured to at least one of:
        convert the optical signal to an electric signal, or
        convert the electrical signal to the optical signal;
    a substrate to which the optical element and the supporting element are attached
        wherein the substrate includes a wiring layer and a resist layer covering the wiring layer,
            the resist layer being configured to avoid at least a part of an opposed area to the supporting element; and
    a UV curable adhesive between the supporting element and the substrate.

2. The optical subassembly according to claim 1, wherein the lens element and the supporting element are made of materials with different optical properties.

3. The optical subassembly according to claim 2, wherein the lens element is made of a resin with a transmittance of 70% or more corresponding to an optical wavelength of the optical signal.

4. The optical subassembly according to claim 1, wherein:
    the UV curable adhesive is configured to avoid at least a part of the resist layer.

5. The optical subassembly according to claim 1, wherein:
    the supporting element has a recess on a side opposed to the substrate, and
    the optical element is inside the recess.

6. The optical subassembly according to claim 1, wherein:
    the UV curable adhesive is provided in an area contained by the resist layer.

7. The optical subassembly according to claim 5, wherein the recess is made to be a confined space with the substrate, the supporting element, the UV curable adhesive, and the lens element.

8. The optical subassembly according to claim 5, further comprising:
    an integrated circuit chip inside the recess.

9. An optical subassembly comprising:
    an optical waveguide for transmitting an optical signal;
    a lens element comprising a lens and a mirror;
    a supporting element to which the optical waveguide and the lens element are attached,
        wherein the supporting element is made of a resin with a transmittance of 60% or more corresponding to ultraviolet light,
        wherein the supporting element has a lower surface opposed to a substrate and an upper surface on which the lens element is mounted, and
        wherein the upper surface slopes with respect to the lower surface to mount the lens element on a slant;
    an optical element configured to at least one of:
        convert the optical signal to an electric signal, or
        convert the electrical signal to the optical signal;
    the substrate to which the optical element and the supporting element are attached; and
    a UV curable adhesive between the supporting element and the substrate.

10. The optical subassembly according to claim 1, wherein:
    the supporting element and at least one of the optical waveguide or the lens element have mutual alignment marks, and
    the supporting element and the substrate have no mutual alignment marks.

11. An optical module comprising:
    a first optical subassembly comprising:
        a first optical waveguide for transmitting a first optical signal;
        a first lens element comprising a first lens and a first mirror;
        a first supporting element to which the first optical waveguide and the first lens element are attached,
            wherein the first supporting element is made of a resin with a transmittance of 60% or more corresponding to ultraviolet light;
        a transmitter optical element configured to convert a first electrical signal to the first optical signal; and
        a substrate, to which the transmitter optical element and the first supporting element are attached, including a wiring layer and a resist layer covering the wiring layer,
            the resist layer being configured to avoid at least a part of an opposed area to the first supporting element;
    a second optical subassembly, separate from the first optical subassembly, comprising:
        a second optical waveguide for transmitting a second optical signal;
        a second lens element comprising a second lens and a second mirror;
        a second supporting element to which the second optical waveguide and the second lens element are attached,
            wherein the second supporting element is made of a resin with a transmittance of 60% or more corresponding to ultraviolet light; and
        a receiver optical element configured to convert the second optical signal to a second electric signal;
    a main substrate,
        wherein the first optical subassembly and the second optical subassembly are on the main substrate.

12. A method for manufacturing an optical subassembly, comprising:
    attaching an optical waveguide, for transmitting an optical signal, on a supporting element;
    attaching a lens element, comprising a lens and a mirror, on the supporting element,
        wherein the supporting element is made of a resin with a transmittance of 60% or more corresponding to ultraviolet light;
    attaching an optical element on a substrate,
        the optical element being configured to:

convert the optical signal to an electric signal, or convert the electrical signal to the optical signal;

providing a UV curable adhesive to the substrate; and attaching the supporting element, to which the optical waveguide and the lens element are attached, to the UV curable adhesive, wherein:
- the supporting element and at least one of the optical waveguide or the lens element are aligned by passive alignment, and
- the supporting element and the substrate are aligned by active alignment.

13. The method according to claim 12, further comprising:

irradiating the UV curable adhesive with ultraviolet rays.

14. The method according to claim 13, wherein the ultraviolet rays are applied through the supporting element.

15. The optical module according to claim 11, wherein the first lens element and the first supporting element are made of materials with different optical properties.

16. The optical module according to claim 11, further comprising:

an adhesion layer configured to avoid at least a part of the resist layer.

17. The optical module according to claim 11, further comprising:

a UV curable adhesive between the first supporting element and the main substrate,
wherein the UV curable adhesive is provided in an area contained by the resist layer.

18. The optical module according to claim 11, wherein:

the first supporting element has a recess on a side opposed to the substrate, and the transmitter optical element is inside the recess.

19. The optical module according to claim 18, further comprising:

an adhesion layer between the first supporting element and the substrate, and around the recess.

20. The optical module according to claim 19, wherein the recess is made to be a confined space with the substrate, the first supporting element, the adhesion layer, and the first lens element.

* * * * *